Jan. 4, 1944. A. B. CLEVELAND ET AL 2,338,622
CLOSURE LOCKING DEVICE
Original Filed Dec. 26, 1939   2 Sheets-Sheet 1
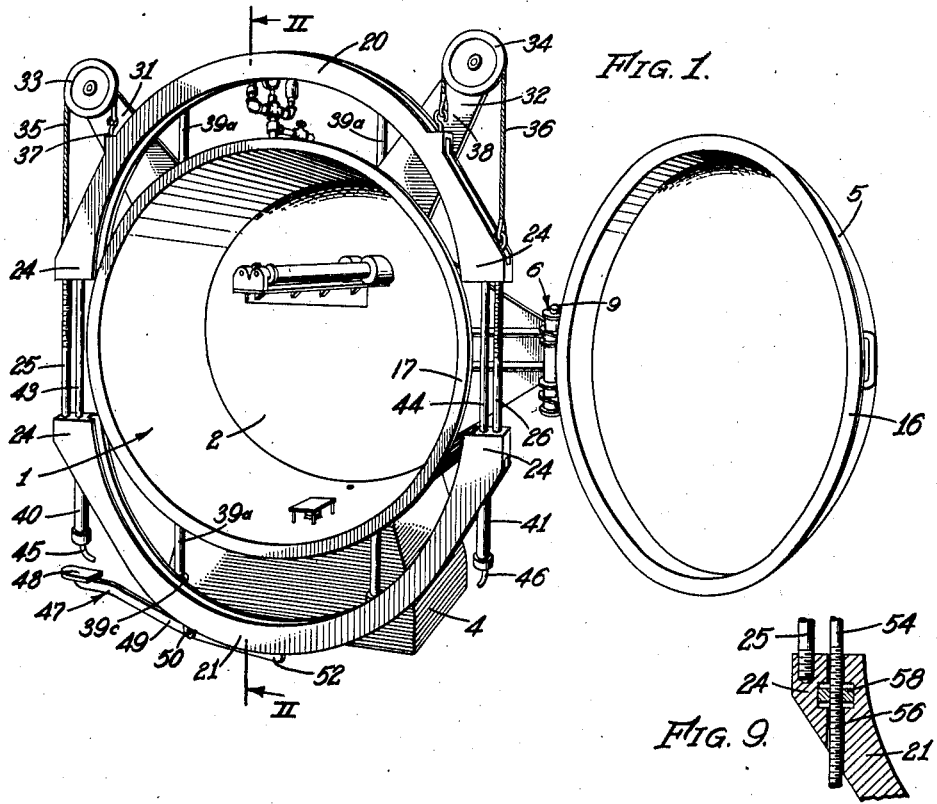
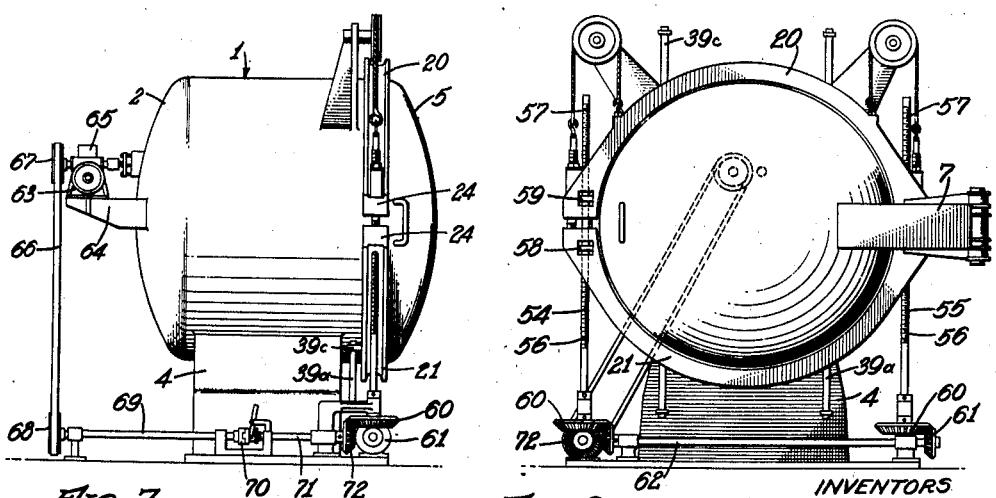
INVENTORS
ARCH B. CLEVELAND
EMIL G. HAAG
CECIL L. RAY
BY
ATTORNEY Jan. 4, 1944. A. B. CLEVELAND ET AL 2,338,622
CLOSURE LOCKING DEVICE
Original Filed Dec. 26, 1939 2 Sheets-Sheet 2
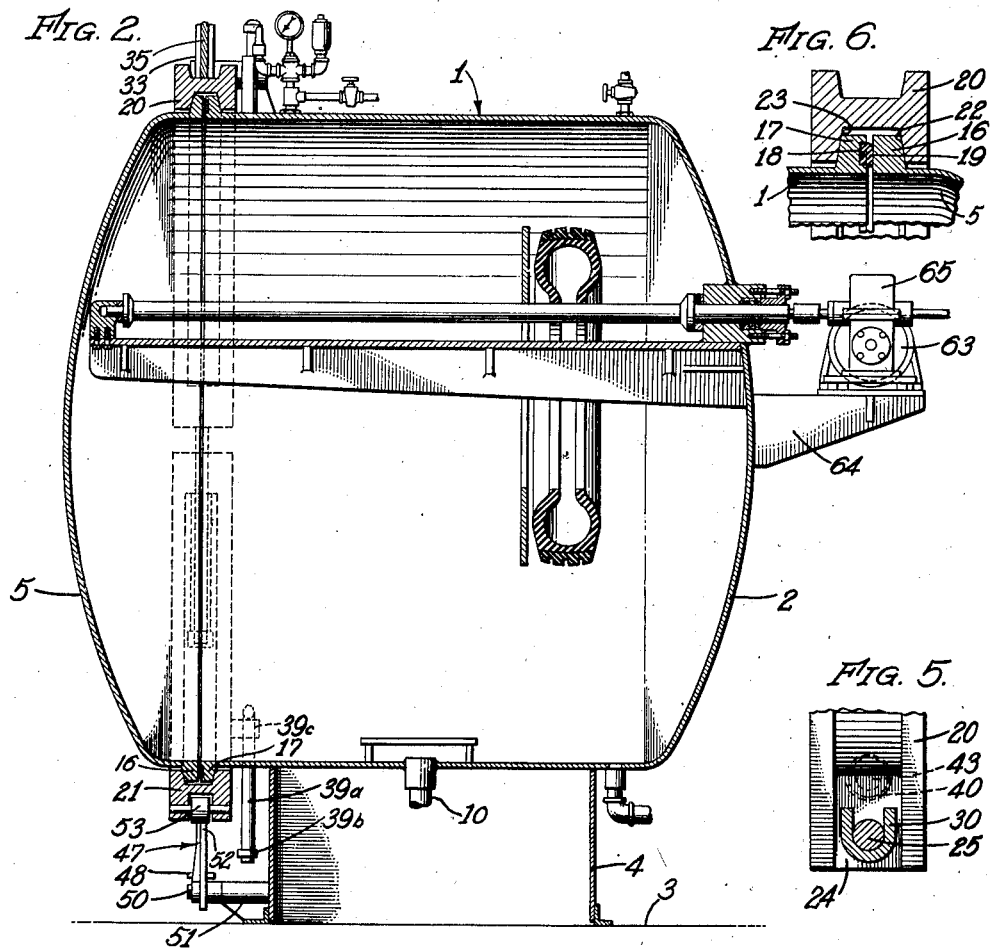
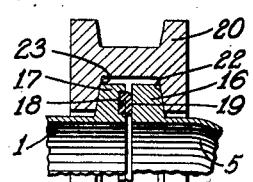
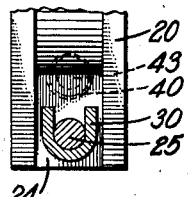
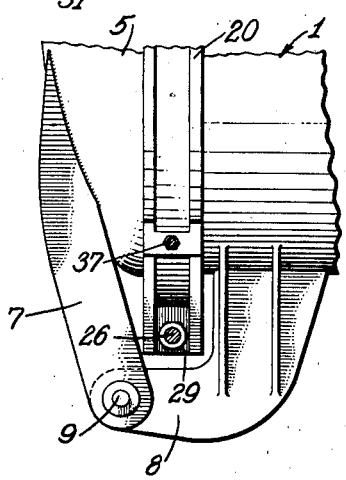
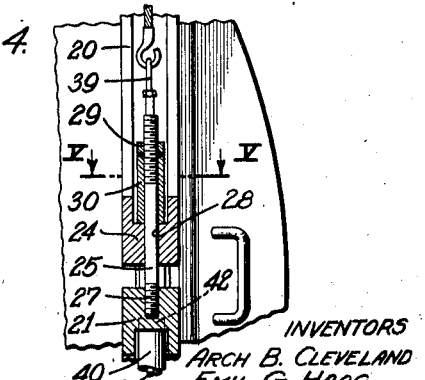
INVENTORS
ARCH B. CLEVELAND
EMIL G. HAAG
CECIL L. RAY
BY
ATTORNEY Patented Jan. 4, 1944

2,338,622

UNITED STATES PATENT OFFICE 2,338,622

CLOSURE LOCKING DEVICE

Arch B. Cleveland, Los Angeles, Emil G. Haag, San Diego, and Cecil L. Ray, Los Angeles, Calif.; said Haag and said Ray assignors to said Cleveland Original application December 26, 1939, Serial No. 310,950. Divided and this application February 10, 1941, Serial No. 378,190

6 Claims. (Cl. 220—61)

Our invention relates to pressure vessels and has particular reference to a closure device therefor which finds particular utility in connection with pressure vessels which, in operation, subject the closure to large forces tending to open the closure.

This application is a division of our copending application Serial No. 310,950, filed December 26, 1939, entitled "Method and apparatus for steam curing," now matured into Patent No. 2,271,855.

In the pressure vessels of the character requiring an openable closure of relatively large dimensions, enormous forces tending to open the closure are produced by the pressure within the vessels. Vessels of this class may include autoclaves, tire vulcanizing kettles, sterilizers, and like vessels which must be openable to permit the insertion and removal of relatively large or bulky articles.

The closure device for such pressure vessels must be readily openable and must be capable of being locked in a closed position with sufficient security to prevent the opening of the closure upon the application of pressure to the interior of the vessel. Such closures must also provide a sufficient seal to prevent fluid under pressure from leaking out of the vessel. In general, the closure device must also be capable of operating satisfactorily at relatively elevated temperatures.

The present types of closure devices are usually clamped across the opening of the vessel by means of two or more spaced clamping devices, such as wing nuts or wedging keepers. In these constructions the clamping pressure is applied at a plurality of points spaced apart about the periphery of the closure, with the result that the mouth of the vessel and the closure must be made inordinately strong and heavy in order to prevent even a slight deformation of these parts under high temperatures and pressures since a slight deformation would reduce the clamping pressure at points between the spaced clamping means and result in leakage. Furthermore, each of the clamping devices must be made very strong since the parts employed must withstand the entire bursting force which is exerted on the closure. As a result of this relatively great strength which is required in the closure and clamps, the present closure devices are heavy, cumbersome and expensive.

It is, therefore, an object of the present invention to provide a closure and closure clamp construction for pressure vessels which overcome the above noted disadvantages by including a means which serves to distribute the clamping forces substantially uniformly about the periphery of the closure member.

It is also an object of our invention to provide a closure construction of the character set forth in the preceding paragraph which includes a clamping member for encircling the closure member and clamping substantially the entire outer edge of the closure member to the vessel.

It is a still further object of our invention to provide a closure construction of the character set forth in the preceding paragraphs which includes a pair of clamping ring halves so constructed that movement of said halves toward each other will wedge the closure and vessel toward each other, whereby a pair of securing means will serve to clamp substantially the entire outer edge of the closure to the vessel.

It is additionally an object of our invention to provide a closure construction of the character set forth in the preceding paragraphs in which a power mechanism is employed for moving the clamping ring halves toward and away from each other.

It is also an object of our invention to provide a closure construction of the character set forth hereinbefore which includes a novel counterbalancing means for carrying the weight of the clamping ring halves.

Other objects and advantages of our invention will be apparent from a study of the following specifications, read in connection with the accompanying drawings, wherein:

Fig. 1 is a perspective view illustrating the preferred form of closure construction of our invention as employed on a curing kettle of the type employed in the vulcanizing of tires and like rubber articles;

Fig. 2 is a longitudinal vertical section of the apparatus illustrated in Fig. 1 taken substantially along the line II—II of Fig. 1 to show the details of construction;

Fig. 3 is a fragmentary plan view illustrating the details of construction of a hinge which may be employed for mounting the closure for the chamber illustrated in Figs. 1 and 2;

Fig. 4 is a fragmentary vertical section illustrating one form of locking means which may be used for locking a clamping ring in place to clamp the closure member to the chamber;

Fig. 5 is a fragmentary horizontal section taken substantially along the line V—V of Fig. 4 showing additional details of construction;

Fig. 6 is a fragmentary cross sectional view taken through the edge of the closure member and the flange of the chamber against which the closure member bears to illustrate the manner in which the clamping ring operates to effect a gas-tight seal between these members;

Fig. 7 is a schematic side elevational view illustrating a modified form of apparatus for moving the clamping ring sections toward and away from each other to clamp and unclamp the closure member to the chamber;

Fig. 8 is a schematic front elevational view of the apparatus illustrated in Fig. 7 and illustrating additional details of construction; and Fig. 9 is a fragmentary vertical section illustrating one manner in which the actuating feed screws employed in the form of apparatus illustrated in Figs. 7 and 8 may be coupled to the clamping ring sections.

Referring to the drawings, we have illustrated in Figs. 1 and 2 a curing kettle or vulcanizing chamber as illustrative of the type of pressure vessel in which enormous opening forces are imposed upon the closure member and for which type of vessel the closure construction of our invention is particularly adapted. The vessel which is illustrated in Figs. 1 and 2 may comprise a substantially cylindrical chamber or tank 1, one end of which may be permanently closed by means of an end bell 2. The casing or chamber 1 of a tire vulcanizing chamber such as is illustrated in Figs. 1 and 2 is ordinarily disposed with its longitudinal axis extended horizontally and maintained a convenient distance above a floor or working surface 3 as by means of a supporting base structure 4.

The end of the chamber 1 opposite to that which is permanently closed by the end bell 2 is fitted with a closure member 5. The closure member 5 being of considerable weight is preferably carried upon the chamber 1 by means of a hinge structure 6. As is clearly shown in Figs. 1 and 3 the hinge structure 6 may include an arm 7 which is securely affixed to the closure member 5 as by welding or other suitable means in a position to extend horizontally outward away from the axis of the chamber 1. The outer end of the arm 7 is preferably bifurcated so as to extend over a similar coacting bracket 8 which is secured to the exterior of the chamber 1. The bracket 8 and the arm 7 are provided with vertical bores at their extremities for receiving a hinge pin 9 adapted to interconnect these members and provide for the free pivotal movement of the closure member 5 about a vertically disposed axis.

In vulcanizing rubber articles such as tires, the uncured rubber is ordinarily subjected to a high pressure and temperature which may be derived from high pressure and temperature steam admitted to the interior of the chamber 1 through a steam connection 10. The high temperature and pressure conditions which are maintained within the chamber 1 produce enormous bursting forces tending to move the closure member 5 to an open position.

We have illustrated in Figs. 2 and 6 a form of construction which is particularly adapted to the purpose of clamping the closure member 5 to open end of the chamber 1 in such manner as to adequately withstand the enormous forces which are imposed on the closure member. As shown in these figures the abutting edges of the closure member 5 and the chamber 1 are provided with integral flange members 16 and 17, the flange member 17 of the chamber 1 being recessed as indicated at 18 to receive high pressure and high temperature packing 19 of any suitable character.

It is, of course, necessary that the flanges 16 and 17 be securely clamped to each other in order to render this packing effective as a seal, and for this purpose we employ a split clamping ring comprising ring halves 20 and 21. Each of these halves is preferably provided with an I cross section such as is illustrated in Fig. 6, the inner recess formed therein being characterized by sloping or tapered sides 22 and 23. The exterior surfaces of the flange members 16 and 17 are provided with correspondingly tapered sides so that, as illustrated in Fig. 6, downward movement of the clamping ring section 20 will provide a wedging force through the interaction of the inter-engaging tapered surfaces tending to move the flanges 16 and 17 toward each other to securely clamp the packing 19 therebetween. The directions of the tapers should be such that an effective and substantially uniform clamping pressure around the entire periphery is obtained by the exertion of a clamping force between the halves 20 and 21. Furthermore, due to the interposition of the packing or gasket 19, it is assured that the clamping pressures along the entire edge of the chamber are substantially equalized.

The clamping ring sections 20 and 21 may be forcibly drawn toward each other to provide this clamping action by forming each of these sections with an enlarged end or boss such as is indicated at 24 in Fig. 1 and by providing clamping bolts 25 and 26 adapted to inter-engage corresponding bosses 24 on the ring sections 20 and 21.

The construction employed in the preferred embodiment of our invention is clearly illustrated in Fig. 4 in which the clamping bolt 25 is illustrated as being permanently engaged with the boss on the lower ring section 21 as by a threaded connection 27 therewith. The bolt 25 is extended upwardly through a clearance hole 28 formed in the boss 24 on the upper ring section 20. The upper end of the clamping bolt 25 is threaded to receive a clamping nut 29 adapted to bear against a horseshoe spacer 30 which is interposed between the nut 29 and the upper surface of the boss 24. It will be observed that tightening the nut 29 down against the horseshoe spacer 30 simultaneously with the tightening of a corresponding nut and spacer associated with the clamping bolt 26 will operate to draw the ring sections 20 and 21 toward each other to effect the desired clamping of the closure member 5 to the end of the chamber 1.

Inasmuch as the clamping ring sections 20 and 21 must be widely separated, as is indicated in Fig. 1, whenever it is desired to open the closure member 5 for the purpose of inserting or removing articles from the interior of the chamber 1, we prefer to provide a counter-balancing mechanism so that the relatively great weight of these ring sections will not impose any particular burden upon an operator attempting to perform the opening or closing operation. This counter-balancing may be readily achieved by providing on the top of the chamber 1 a pair of upwardly and outwardly extending arms 31 and 32 which terminate in pivotal supports for pulleys or sheaves 33 and 34. Cables 35 and 36 may be attached to opposite sides of the upper ring section 20 as by means of eye bolts 37 and 38 and passed over the sheaves 33 and 34 and into connection with the upstanding ends of the clamping bolts 25 and 26.

The connection between the cables 35 and 36 and the clamping bolts 25 and 26 may be readily effected by providing eye bolts 39 which are threadedly engaged with a threaded bore provided in the upper end of the clamping bolts 25 and 26. It will be observed that with this arrangement the weight of one of the ring sections operates to counterbalance the weight of the other ring section so that these sections may be mutually and simultaneously moved toward or away from each other with relatively little effort.

Separable movement of the ring sections away from each other may be arrested by means of stop members, each of which may comprise a vertically extending rod 39a secured to the exterior of the chamber 1 and including a head portion 39b adapted to arrest downward movement of a lug 39c which is secured to the ring section and which encircles the rod 39a.

It has been found that the length of the threaded portion of the clamping bolts 25 and 26 may be materially reduced and the amount of movement of the clamping nuts 29 required to effect the desired clamping operation may be materially reduced through the use of the aforementioned horseshoe spacer 30. By using this spacer it is only necessary to loosen the clamping nut 29 and then slide the spacer 30 horizontally outward from around the clamping bolts 25 and 26 in order to provide for sufficient separable movement between the ring halves 20 and 21 to release the closure 5 from the chamber 1.

If the chamber has been left closed for a considerable length of time and has been subjected to relatively high temperatures and pressures during such time, the ring sections 20 and 21 tend to stick and be difficult to start in their separable movement. In order to facilitate the initial separation of these ring sections we provide a mechanical means for applying a separating force therebetween. This mechanical means may include a pair of pneumatic or hydraulic cylinders 40 and 41 which are secured to the lower ring section 21 as by threaded engagement between the upper end of the cylinders and a suitable threaded bore provided in the lower surface of the bosses 24 as indicated at 42 in Fig. 4. These lower bosses are also provided with a continuing bore through which pistons rods 43 and 44 may extend upwardly into engagement with the under surface of the upper pair of bosses 24. A suitable pneumatic fluid may be admitted to the cylinders 40 and 41 by means of fluid connections 45 and 46 to force the piston rods 43 and 44 upwardly into engagement with the under surfaces of the upper bosses 24 to apply a force between the ring sections 20 and 21 and effect the initial separation thereof.

Movement of the ring sections 20 and 21 toward each other when it is desired to close the chamber 1 may be facilitated through the use of a foot pedal 47 which may include a pedal portion 48 secured to a transversely extending arm 49 pivotally connected as indicated at 50 in Figs. 1 and 2 to a suitable supporting bracket 51 provided on the supporting structure 4. The arm 49 may include a portion 52 which is normally disposed below the center of the lower ring section 21 and adapted to be brought into engagement with a roller 53 pivotally supported within the channel formed by the I section of this clamping ring so that downward movement of the pedal portion 48 may be translated into an upward movement of the lower ring section 21. The upward movement of the ring section 21 will cause a corresponding downward movement of the ring section 20, bringing these sections into relatively closely abutting relation so that the horseshoe spacers 30 may be interposed between the clamping nuts 29 and the bosses 24. The clamping nuts 29 may then be tightened to effect the desired seal as hereinbefore described.

It will be appreciated, of course, that the movement of the clamping ring halves 20 and 21 toward each other may also be effected through use of the hydraulic cylinders 40 and 41 by arranging the cylinders in such manner as to permit application of fluid pressure to the upper surfaces of the pistons mounted therein alternatively with the admission of fluid through the fluid connections 45 and 46.

We have illustrated in Figs. 7, 8 and 9 an alternative type of mechanism which may be employed for separating the ring halves 20 and 21. As illustrated in these figures, the bosses 24 may be bored to receive upwardly extending feed screws 54 and 55. Each of these feed screws is provided on its lower portion with right hand threads 56 and on its upper portion with left hand threads 57. These threaded portions are engaged with correspondingly threaded nuts 58 and 59 carried in suitable recesses formed in the body of the lugs 24. It will be observed that rotation of the feed screws 54 and 55 in one direction will operate to move the ring sections 20 and 21 away from each other while a reverse rotation will operate to move the ring sections toward each other.

The feed screws 54 and 55 may be coupled together for simultaneous rotation by means of bevel gears 60 affixed to the lower end of each of these feed screws and drivably engaged with similar bevel gears 61 mounted on the ends of an interconnecting countershaft 62. Power for rotating the feed screws 54 and 55 may be derived from an electric motor 63 suitably supported from the chamber end bell 2 as by means of a supporting bracket 64. The motor 63 which is illustrated in Figs. 2 and 7 comprises a part of the vulcanizing equipment which is associated with the vulcanizing chamber 1 and this motor may be used as a source of power for rotating the feed screws 54 and 55.

In case the vessel to which the closure construction of our invention is applied does not include an electric motor or similar source of mechanical power, such a source may be provided and mounted in any suitable location. As is illustrated in Figs. 7 and 8, the motor 63 is arranged to drive a power take-off shaft through a gear reduction unit 65 and a belted connection 66 may be provided between a pulley 67 affixed to this power take-off shaft and another pulley 68 secured to a longitudinally extending drive shaft 69. The drive shaft 69 may be coupled by means of a clutch 70 to a shaft extension 71 which carries on its outer end a bevel gear 72 arranged to mesh with and drive one of the aforementioned bevel gears 60.

In order that this mechanism may be used for both opening and closing the ring sections, it is preferred that the motor 63 be reversible in operation, although the same result could be achieved by interposing a reversing gear system between the drive shaft 69 and the mechanism which is driven thereby. It is intended that such a mechanism be employed for opening and closing the ring sections, but it is anticipated that such a mechanism may not have sufficient power to provide the necessary forcible clamping of the ring halves to achieve the desired gastight seal. The clamping bolts 25 and 26 are accordingly retained in this modification so that tremendous clamping pressures may be exerted upon the ring halves. Since such clamping pressures may result in relative movement between the ring sections, we prefer to make the recesses in which the nuts 58 and 59 are disposed of such shape as to provide for a slight amount of vertical movement of these nuts relative to the lugs 24, thus permitting the nuts to remain stationary on the feed screws and the ring sections 20 and 21 to be moved relative thereto during the time they are being clamped together by means of the clamping bolts 25 and 26.

From the foregoing it will be observed that we have provided a closure construction and a clamp therefor which is particularly suitable for use in locking in a closed position the closure members employed on pressure vessels of the character which subject the closure members to extremely high bursting forces.

The construction of our invention operates to distribute the locking or clamping force which is applied between the closure member and the vessel substantially uniformly around the entire periphery of the closure. This is accomplished through use of the split clamping ring sections which are provided with a tapered recess adapted to coact with correspondingly tapered flanges formed on the closure and the mouth of the pressure vessel.

Attention is directed particularly to the fact that a pair of clamping bolts or other securing means will serve to provide enormous forces locking the closure to the vessel by virtue of the large mechanical advantage provided by the wedging action between the clamping ring and the closure member.

Attention is also directed to the fact that the closure construction of our invention includes also a novel counter-balancing arrangement for supporting the weight of the clamping ring halves and that our invention also includes novel power mechanisms for moving the clamping ring halves toward and away from each other.

While we have shown and described the preferred embodiment of our invention, we do not desire to be limited to any of the details of construction shown or described herein, except as defined in the appended claims.

We claim:

1. In a device for locking a closure member in a closed position across the open end of a chamber, the combination of: a pair of separable ring halves; means mounting said halves for movement between a locked and a released position; coacting means on said ring halves, said closure member and said chamber for locking said closure member to said chamber upon movement of said halves to said locked position; a clamping bolt secured to each of the opposite sides of one of said halves and extending through an aperture in the other of said halves; a clamping nut on the projecting end of each of said clamping bolts; and a spacer having a U-shaped cross section surrounding each of said clamping bolts between said nuts and said other ring half, whereby loosening said nuts and removing said spacer permits a relatively large movement of said halves away from each other.

2. In a device for locking a closure member in a closed position across the open end of a chamber, the combination of: a pair of separable ring halves, each having a nut receiving recess formed therein near each of the ends thereof; means mounting said halves for movement between a locked and a released position; coacting means on said ring halves, said closure member and said chamber for locking said closure member to said chamber upon movement of said halves to said locked position; a nut mounted loosely in each of said recesses for limited movement relative to said halves; a pair of feed screws each engaged by threads of one hand with a nut carried by one of said halves and engaged by threads of the opposite hand with a nut carried by the other of said halves; and power means coupled to simultaneously rotate said feed screws to move said halves between said positions.

3. In a device for locking a closure member in a closed position across the open end of a chamber, the combination of: a pair of separable ring halves, each having a nut receiving recess formed therein near each of the ends thereof; means mounting said halves for movement between a locked and a released position; coacting means on said ring halves, said closure member and said chamber for locking said closure member to said chamber upon movement of said halves to said locked position; a nut mounted loosely in each of said recesses for limited movement relative to said halves; a pair of feed screws each engaged by threads of one hand with a nut carried by one of said halves and engaged by threads of the opposite hand with a nut carried by the other of said halves; power means coupled to simultaneously rotate said feed screws to move said halves between said positions; and a pair of separate clamping means inter-engaging opposite ends of said ring halves, whereby said halves may be further clamped in said locked position, further movement of said halves being permitted by the loose mounting of said nuts in said nut receiving recesses.

4. In a sealing mechanism for a container, a cover for the container, said cover and container having coacting flanges with opposed adjacent surfaces, a plurality of ring sections for engaging said flanges, and adapted substantially entirely to extend around the container, and to urge said flanges toward each other for sealing the container, and means for exerting a force for causing relative movement of the sections with respect to the flanges, comprising fluid pressure cylinders and cooperating pistons therein, each of the cylinders being attached to an end of a ring section and having an axis corresponding to the direction of movement of the section, and each of the pistons being attached to an end of a ring section that is adjacent an end that carries a cylinder.

5. In a device for locking a closure member in a closed position across the open end of a chamber, the combination of: a pair of separable ring halves; means mounting said halves for movement between a locked and a released position; coacting means on said ring halves, said closure member and said chamber for locking said clocure member to said chamber upon movement of said halves to said locked position; a pair of clamping bolts, each projecting through an aperture in one end of a ring half and secured to the adjacent end of the other ring half; clamping nuts on the projecting ends of said bolts; and spacers respectively surrounding said bolts between the nuts and the ring half through which the respective bolt projects, each of said spacers being slotted to permit removal of said spacers by movement of said spacers transverse to the corresponding bolt axes.

6. In a sealing mechanism for a container, a cover for the container, said cover and container having coacting flanges with opposed adjacent surfaces, a pair of ring halves having a channel for the accommodation of said flanges, means for urging said halves together to clamp the flanges against each other, said means including a pair of bolts attached to the ends of one half and projecting respectively through the adjacent ends of the other half, and a counterbalancing mechanism, comprising a pair of guide pulleys mounted on the container, flexible elements respectively passing around the pulleys and anchored at one of their ends to the one half, and anchored at the other of their ends respectively to the ends of the other half by being attached to the ends of the bolts.

ARCH B. CLEVELAND.
EMIL G. HAAG.
CECIL L. RAY.